US006534146B1

(12) United States Patent
Mentz, Jr.

(10) Patent No.: US 6,534,146 B1
(45) Date of Patent: Mar. 18, 2003

(54) DUAL PURPOSE FLOOR MAT

(76) Inventor: James W. Mentz, Jr., 2266 Porter Rd., Bear, DE (US) 19701

( * ) Notice: Subject to any disclaimer, the term of this patent is extended or adjusted under 35 U.S.C. 154(b) by 188 days.

(21) Appl. No.: 09/632,929

(22) Filed: Aug. 4, 2000

(51) Int. Cl.[7] ............................. B32B 3/02; A47K 7/02
(52) U.S. Cl. ......................... 428/95; 15/215; 15/216; 15/217; 15/237; 15/238; 15/239; 296/97.23; 238/14
(58) Field of Search .......................... 15/215, 216, 217, 15/237, 238, 239, 112; 296/97.23; 428/95; 238/14

(56) References Cited

U.S. PATENT DOCUMENTS

| 3,387,315 A | * | 6/1968 | Stata ............................. 15/215 |
| 3,823,058 A | * | 7/1974 | Yamaguchi .................. 161/119 |
| 4,109,439 A | | 8/1978 | Feasel |
| D259,416 S | | 6/1981 | Bell et al. |
| 4,382,986 A | | 5/1983 | Reuben |
| 4,588,628 A | | 5/1986 | Roth |
| D302,263 S | | 7/1989 | Charet et al. |
| 4,921,742 A | * | 5/1990 | Altus ............................ 428/81 |
| 5,725,926 A | | 3/1998 | Wang |

FOREIGN PATENT DOCUMENTS

| EP | 0247677 | * 12/1987 | ............ B60N/3/04 |

\* cited by examiner

Primary Examiner—Terrel Morris
Assistant Examiner—Alexis Wachtel

(57) ABSTRACT

A dual purpose floor mat for providing a better floor mat for vehicles that will better protect the floor of the vehicle. The dual purpose floor mat includes a mat member having a bottom wall and also having side and end walls securely attached to and extending along a perimeter of the bottom wall with the bottom wall having a first and second portion; and also includes a floor member being attached to the mat member and having a wall and a first and second side; and further includes a plurality of scraping members being spaced apart and being securely attached to the first end portion of the bottom wall and to the first side of the floor member; and also includes fabric covering securely disposed upon the second portion of the bottom wall and upon the second side of the floor member.

11 Claims, 3 Drawing Sheets

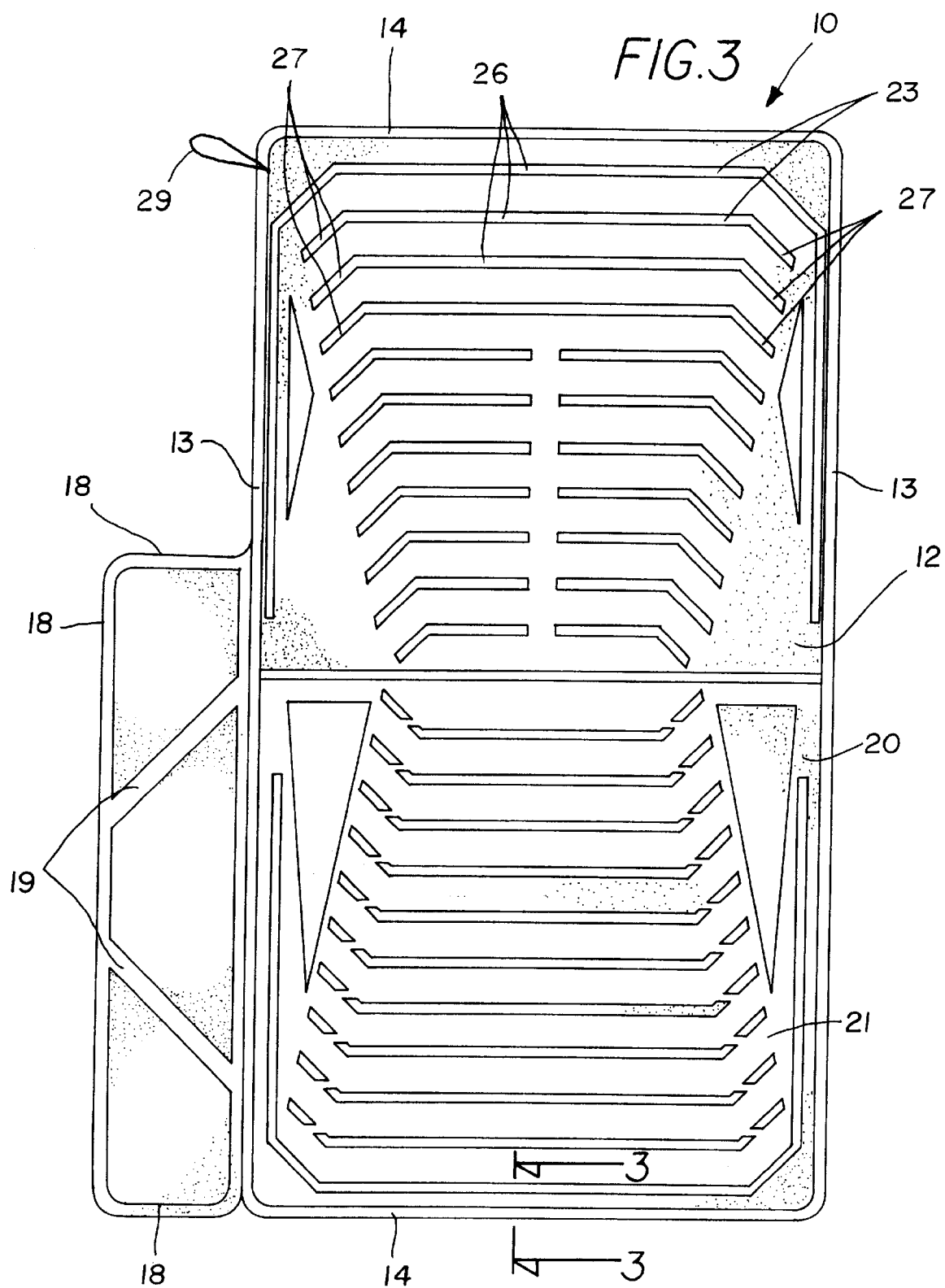

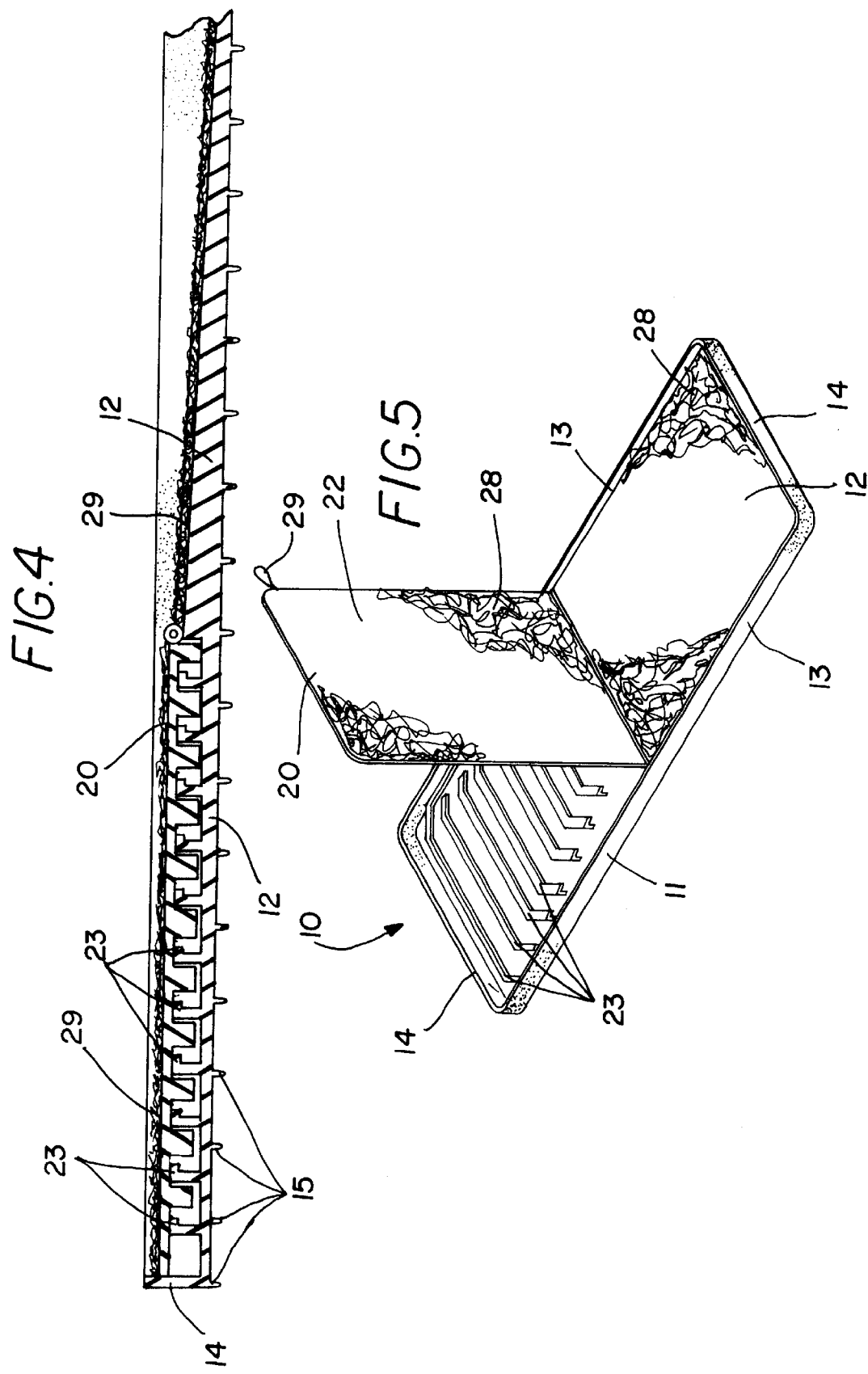

DUAL PURPOSE FLOOR MAT

BACKGROUND OF THE INVENTION

1. Field of the Invention

The present invention relates to a floor mat and more particularly pertains to a new dual purpose floor mat for providing a better floor mat for vehicles that will better protect the floor of the vehicle.

2. Description of the Prior Art

The use of a floor mat is known in the prior art. More specifically, a floor mat heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,725,926; U.S. Pat. No. 4,382,986; U.S. Pat. No. 4,109,439; U.S. Pat. No. 4,588,628; U.S. Pat. No. Des. 259,416; and U.S. Pat. No. Des. 302,263.

While these devices fulfill their respective, particular objectives and requirements, the aforementioned patents do not disclose a new dual purpose floor mat. The inventive device includes a mat member having a bottom wall and also having side and end walls securely attached to and extending along a perimeter of the bottom wall with the bottom wall having a first and second portion; and also includes a floor member being attached to the mat member and having a wall and a first and second side; and further includes a plurality of scraping members being spaced apart and being securely attached to the first end portion of the bottom wall and to the first side of the floor member; and also includes fabric covering securely disposed upon the second portion of the bottom wall and upon the second side of the floor member.

In these respects, the dual purpose floor mat according to the present invention substantially departs from the conventional concepts and designs of the prior art, and in so doing provides an apparatus primarily developed for the purpose of providing a better floor mat for vehicles that will better protect the floor of the vehicle.

SUMMARY OF THE INVENTION

In view of the foregoing disadvantages inherent in the known types of floor mat now present in the prior art, the present invention provides a new dual purpose floor mat construction wherein the same can be utilized for providing a better floor mat for vehicles that will better protect the floor of the vehicle.

The general purpose of the present invention, which will be described subsequently in greater detail, is to provide a new dual purpose floor mat which has many of the advantages of the floor mat mentioned heretofore and many novel features that result in a new dual purpose floor mat which is not anticipated, rendered obvious, suggested, or even implied by any of the prior art floor mat, either alone or in any combination thereof.

To attain this, the present invention generally comprises a mat member having a bottom wall and also having side and end walls securely attached to and extending along a perimeter of the bottom wall with the bottom wall having a first and second portion; and also includes a floor member being attached to the mat member and having a wall and a first and second side; and further includes a plurality of scraping members being spaced apart and being securely attached to the first end portion of the bottom wall and to the first side of the floor member; and also includes fabric covering securely disposed upon the second portion of the bottom wall and upon the second side of the floor member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dual purpose floor mat which has many of the advantages of the floor mat mentioned heretofore and many novel features that result in a new dual purpose floor mat which is not anticipated, rendered obvious, suggested, or even implied by any of the prior art floor mat, either alone or in any combination thereof.

It is another object of the present invention to provide a new dual purpose floor mat which may be easily and efficiently manufactured and marketed.

It is a further object of the present invention to provide a new dual purpose floor mat which is of a durable and reliable construction.

An even further object of the present invention is to provide a new dual purpose floor mat which is susceptible of a low cost of manufacture with regard to both materials and labor, and which accordingly is then susceptible of low prices of sale to the consuming public, thereby making such dual purpose floor mat economically available to the buying public.

Still yet another object of the present invention is to provide a new dual purpose floor mat which provides in the apparatuses and methods of the prior art some of the advantages thereof, while simultaneously overcoming some of the disadvantages normally associated therewith.

Still another object of the present invention is to provide a new dual purpose floor mat for providing a better floor mat for vehicles that will better protect the floor of the vehicle.

Yet another object of the present invention is to provide a new dual purpose floor mat which includes a mat member having a bottom wall and also having side and end walls securely attached to and extending along a perimeter of the bottom wall with the bottom wall having a first and second portion; and also includes a floor member being attached to the mat member and having a wall and a first and second side; and further includes a plurality of scraping members being spaced apart and being securely attached to the first end portion of the bottom wall and to the first side of the floor member; and also includes fabric covering securely disposed upon the second portion of the bottom wall and upon the second side of the floor member.

Still yet another object of the present invention is to provide a new dual purpose floor mat that allows the user to effectively cleans one's shoes and then allows the user to have a nice carpeted floor mat.

Even still another object of the present invention is to provide a new dual purpose floor mat that is convenient and easy to maintain and keep the carpeted portion of the floor mat clean.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view of the present invention.

FIG. 4 is a cross-sectional view of the present invention.

FIG. 5 is another top perspective view of the present invention.

DESCRIPTION OF THE PREFERRED EMBODIMENT

Figure 1:
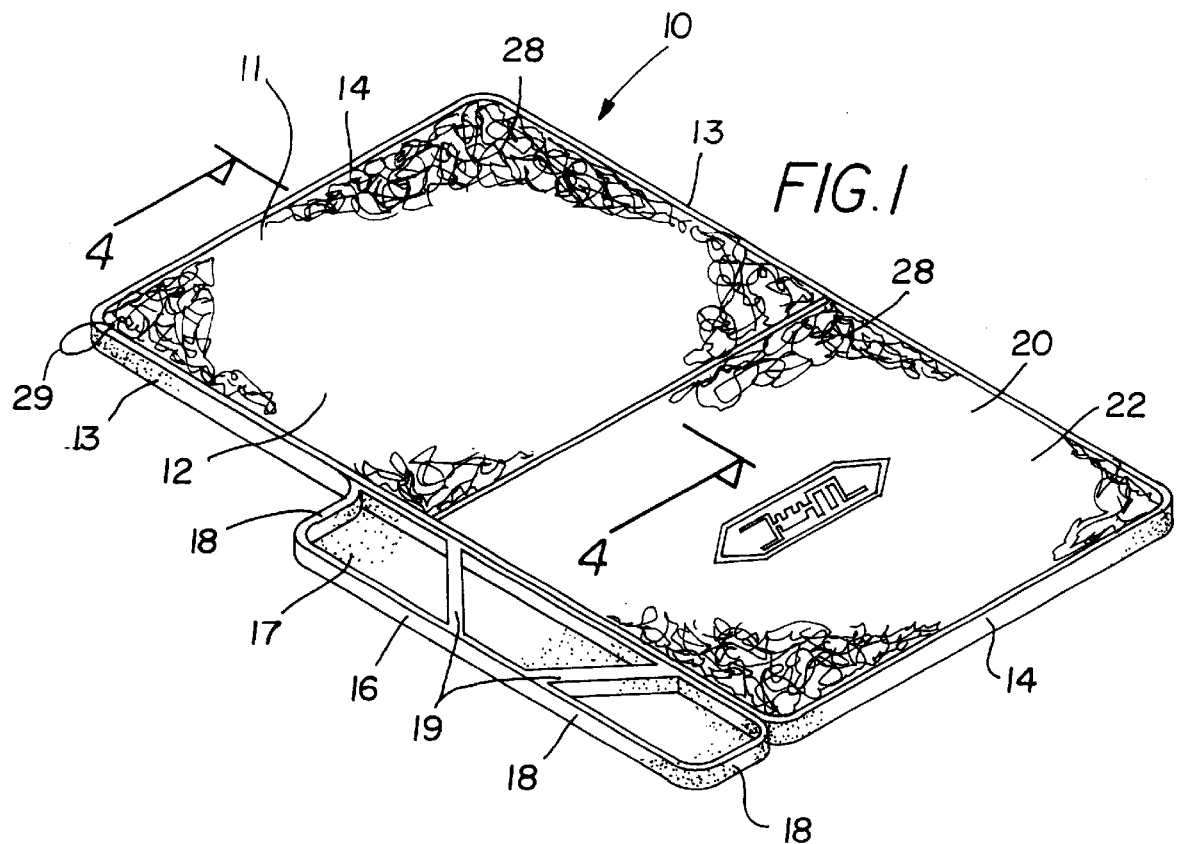
FIG. 1 is a top perspective view of a new dual purpose floor mat according to the present invention.
Figure 2:
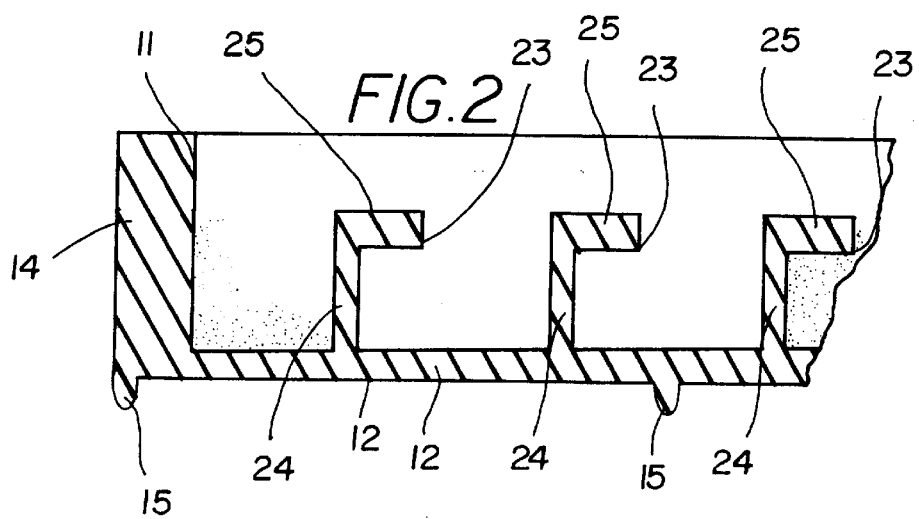
FIG. 2 is a detailed cross-sectional view of the present invention showing the scraping members, in particular.

With reference now to the drawings, and in particular to FIGS. 1 through 5 thereof, a new dual purpose floor mat embodying the principles and concepts of the present invention and generally designated by the reference numeral 10 will be described.

As best illustrated in FIGS. 1 through 5, the dual purpose floor mat 10 generally comprises a mat member 11 having a bottom wall 12 and also having side 13 and end 14 walls securely and integrally attached to and extending along a perimeter of the bottom wall 12. The bottom wall 12 has a first and second portion. The mat member 11 includes a plurality of non-slip members 15 securely and conventionally disposed upon a bottom of the bottom wall 12 to prevent the mat member 11 from sliding and slipping upon a surface. Each of non-slip members 15 is essentially a nib-like member with the nib-like members 15 being spaced about upon the bottom of the bottom wall 12. The mat member 11 also includes an extended portion 16 being integrally appended to a portion of one of said side walls 13 thereof with the extended portion 16 including a bottom wall 17, side and end walls 18 extending along a perimeter thereof and cross members 19 securely and conventionally disposed upon the bottom wall 17 and interconnecting the side walls 13, 18. The mat member 11 includes a handle strap 29 securely and conventionally attached to one of the side walls 13 for carrying the dual purpose floor mat 10.

A floor member 20 is attached to the mat member 11 and has a wall and a first 21 and second 22 side. The floor member 20 has an end which is hingedly attached to the side walls 13 of the bottom wall 12 intermediate of the end walls 14 of the mat member 11. The floor member 20 is adapted to cover upon either of the first and second portions of the bottom wall 12. The first side 21 of the floor member 20 faces the first portion of the bottom wall 12 when the floor member 20 is disposed upon the first portion. The second side 22 of the floor member 20 faces the second portion of the bottom wall 12 when the floor member 20 is disposed upon the second portion.

A plurality of scraping members 23 are spaced apart and are securely conventionally attached to the first portion of the bottom wall 12 and to the first side 21 of the floor member 20. Each of the scraping members 23 includes a lower longitudinal side portion 24 having an end which is securely attached upon the bottom wall 12, and also includes an upper longitudinal side portion 25 which is angled relative to the lower longitudinal side portion 24. The lower longitudinal side portion 24 is disposed generally perpendicular to the bottom wall 12 and to the upper longitudinal side portion 25 with the scraping members 23 being essentially elongate scraping members 23 arranged in rows upon the mat member 11 and the floor member 20. Each of the elongate scraping members 23 includes a main portion 26 which is disposed generally parallel to the end walls 14 of the mat member 11, and also includes one or more end portions 27 which are angled relative to the main portion 26. The end portions 27 of the elongate scraping members 23 are directed toward a center of the mat member 11 to effectively channel debris toward a center of the mat member 11. A fabric covering 28 such as carpeting is securely and conventionally disposed upon the second portion of the bottom wall 12 and upon the second side 22 of the floor member 20. The side 13 and end 14 walls of the mat member 11 extend higher than the scraping members 23.

In use, the user places the dual purpose floor mat 10 upon the floor of vehicle and flips the floor member 20 over upon its first 21 or second 22 side depending upon with the user wants to be able to scrape one's footwear. The user can either have a floor mat 10 having wither a carpeted top surface or a scraping top surface by easily flipping the floor member 20 either one way or the other.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual purpose floor mat comprising:
   a mat member having a bottom wall and also having side and end walls attached to and extending along a perimeter of said bottom wall, said bottom wall having a first and second portion:
   a floor member having a wall and a first and second side, said floor member being pivotally mounted on said bottom wall of said mat member between said first and second portions of said bottom wall such that said floor member has a first position wherein said floor member covers said first portion of said bottom wall and a second position wherein said floor member covers said second portions of said bottom wall;
   a plurality of scraping members being spaced apart and being attached to said First portion of said bottom wall and to said first side of said floor member such that said scraping members are exposed on said floor member and said mat member when said floor member is in said first position; and
   a first fabric covering disposed upon said second portion of said bottom wall and a second fabric covering disposed upon said second side of said floor member such that said fabric coverings are exposed on said floor member and said mat member when said floor member is in said second position,
   wherein said scraping members extend in rows on said mat member and said floor member, said scraping members being arranged on said mat member and said floor member in a manner such that said scraping members on said mat member are positioned between and extend between said scraping members on said floor member when said floor member is in said first position for minimizing a stacked height on said floor member on said mat member when said floor member is located in said first position.

2. A dual purpose floor mat as described in claim 1, wherein each of said scraping members includes a lower longitudinal side portion having an end attached upon bottom wall and an upper longitudinal side portion which is angled relative to said lower side portion.

3. A dual purpose floor mat as described in claim 2, wherein said lower longitudinal side portion is disposed generally perpendicular to said bottom wall and perpendicular to said upper longitudinal side portion.

4. A dual purpose floor mat as described in claim 1, wherein said first side of said floor member faces said first portion of said bottom wall when said floor member is disposed upon said first portion.

5. A dual purpose floor mat as described in claim 1, wherein said second side of said floor member faces said second portion of said bottom wall when said floor member is disposed upon said second portion.

6. A dual purpose floor mat as described in claim 1, wherein said mat member includes a plurality of non-slip members disposed upon a bottom of said bottom wall to resist sliding of said mat member upon a surface.

7. A dual purpose floor mat as described in claim 6, wherein each of non-slip members comprises a protruding member protruding from the bottom of said bottom wall, said protruding members being spaced about upon said bottom of said bottom wall.

8. A dual purpose floor mat as described in claim 1, wherein said side and end walls of said mat member extend upwardly from a top of said bottom wall a greater distance than said scraping members.

9. A dual purpose floor mat as described in claim 1, wherein said mat member includes an extended portion being integrally appended to a portion of one of said side walls thereof, said extended portion including a bottom wall, side and end walls extending along a perimeter thereof, and cross members disposed upon said bottom wall and interconnecting said side walls.

10. A dual purpose floor mat as described in claim 1, wherein each of said elongate scraping members includes a main portion which is disposed generally parallel to said end walls of said mat member and at least one end portion which is angled relative to said main portion, said end portions of said elongate scraping members being angled toward a center of said mat member to effectively channel debris toward a center of said mat member.

11. A dual purpose floor mat comprising:
    a mat member having a bottom wall and also having side and end walls attached to and extending along a perimeter of said bottom wall, said bottom wall having a first and second portion;
    a floor member having a wall and a first and second side, said floor member being pivotally mounted on said bottom wall of said mat member between said first and second portions of said bottom wall such that said floor member has a first position wherein said floor member covers said first portion of said bottom wall and a second position wherein said floor member covers said second portions of said bottom wall;
    a plurality of scraping members being spaced apart and being attached to said first portion of said bottom wall and to said first side of said floor member such that said scraping members are exposed on said floor member and said mat member when said floor member is in said first position; and
    a first fabric covering, disposed upon said second portion of said bottom wall and a second fabric covering disposed upon said second side of said floor member such that said fabric coverings are exposed on said floor member and said mat member when said floor member is in said second position;
    wherein said scraping members extend in rows on said mat member and said floor member, said scraping members being arranged on said mat member and said floor member in a manner such that said scraping members on said mat member are positioned between and extend between said scraping members on said floor member when said floor member is in said first position for minimizing a stacked height on said floor member on said mat member when said floor member is located in said first position.
    wherein each of said scraping members includes a lower longitudinal side portion having an end attached upon said bottom wall and an upper longitudinal side portion which is angled relative to said lower side portion;
    wherein said lower longitudinal side portion is disposed generally perpendicular to said bottom wall and perpendicular to said upper longitudinal side portion;
    wherein said first side of said floor member faces said first portion of said bottom wall when said floor member is disposed upon said first portion;

wherein said second side of said floor member faces said second portion of said bottom wall when said floor member is disposed upon said second portion;

wherein said mat member includes a plurality of non-slip members disposed upon a bottom of said bottom wall to resist sliding of said mat member upon a surface;

wherein each of non-slip members comprises a protruding member protruding from the bottom of said bottom wall, said protruding members being spaced about upon said bottom of said bottom wall;

wherein said side and end walls of said mat member extend upwardly from a top of said bottom wall a greater distance than said scraping members;

wherein said mat member includes an extended portion being integrally appended to a portion of one of said side walls thereof, said extended portion including a bottom wall, side and end walls extending along a perimeter thereof, and cross members disposed upon said bottom wall and interconnecting said side walls; and wherein each of said elongate scraping members includes a main portion which is disposed generally parallel to said end walls of said mat member and at least one end portion which is angled relative to said main portion, said end portions of said elongate scraping members being angled toward a center of said mat member to effectively channel debris toward a center of said mat member.

\* \* \* \* \*